(12) United States Patent
Smith

(10) Patent No.: US 6,592,762 B2
(45) Date of Patent: Jul. 15, 2003

(54) PROCESS FOR TREATING BOD-CONTAINING WASTEWATER

(75) Inventor: George W. Smith, Pewaukee, WI (US)

(73) Assignee: United States Filter Corporation, Palm Desert, CA (US)

(*) Notice: Subject to any disclaimer, the term of this patent is extended or adjusted under 35 U.S.C. 154(b) by 0 days.

(21) Appl. No.: 09/941,535

(22) Filed: Aug. 29, 2001

(65) Prior Publication Data

US 2003/0042199 A1 Mar. 6, 2003

(51) Int. Cl.[7] ................................................. C02F 3/30
(52) U.S. Cl. ...................... 210/605; 210/623; 210/629; 210/903; 210/906
(58) Field of Search ................................. 210/605, 620, 210/621–623, 629, 630, 903, 906

(56) References Cited

U.S. PATENT DOCUMENTS

| | | | |
|---|---|---|---|
| 2,430,519 A | * 11/1947 | Mallory | 210/605 |
| 2,441,813 A | * 5/1948 | Halvorson | 210/605 |
| 3,764,523 A | 10/1973 | Stankewich, Jr. | |
| 3,900,394 A | * 8/1975 | Rongved | 210/629 |
| 3,939,068 A | 2/1976 | Wendt et al. | |
| 3,953,327 A | 4/1976 | Parker | |
| 3,964,998 A | 6/1976 | Barnard | |
| 3,994,802 A | 11/1976 | Casey et al. | |
| 4,056,465 A | 11/1977 | Spector | |
| 4,162,153 A | * 7/1979 | Spector | 71/12 |
| 4,315,821 A | * 2/1982 | Climenhage | 210/605 |
| 4,629,559 A | 12/1986 | Smith | |
| 4,867,883 A | 9/1989 | Daigger et al. | |
| 4,961,854 A | 10/1990 | Wittmann et al. | |
| 4,975,197 A | 12/1990 | Wittmann et al. | |
| 5,480,548 A | 1/1996 | Daigger et al. | |
| 5,531,896 A | * 7/1996 | Tambo et al. | 210/605 |
| 5,824,222 A | * 10/1998 | Keyser et al. | 210/607 |
| 6,406,629 B1 | * 6/2002 | Husain et al. | 210/605 |

FOREIGN PATENT DOCUMENTS

EP 0849230 * 6/1998

OTHER PUBLICATIONS

U.S. Filter/Envirex; The Orbal System for Biological Treatment; Aug. 1997; Bulletin No. U.S.F. 315–151R3; U.S. Filter/Envirex, Waukesha, WI, USA.

U.S. Filter/Envirex; Vertical Loop Reactor For Biological Treatment; Feb. 1998; Bulletin No. U.S.F. 315–15A1–R1; U.S. Filter/Envirex; Waukesha, WI, USA.

* cited by examiner

Primary Examiner—Fred Prince
(74) Attorney, Agent, or Firm—Michael Best & Friedrich LLP

(57) ABSTRACT

A process for treating BOD, nitrogen and phosphorus containing wastewater. The process includes introducing wastewater influent into an anaerobic zone having activated sludge and mixing the wastewater influent with the activated sludge in the anaerobic zone to form a mixed liquor. The mixed liquor is introduced into an oxygen-deficit aeration zone, and denitrified mixed liquor from the oxygen-deficit aeration zone is recycled to the anaerobic zone for mixing therein with wastewater. The process also includes transferring the mixed liquor from the oxygen-deficit aeration zone to an oxygen-surplus aeration zone, transferring a portion of the mixed liquor from the oxygen-surplus aeration zone to a settling zone wherein a supernatant is separated from settled sludge and recycling at least a portion of the settled sludge to the oxygen-deficit aeration zone as recycled activated sludge.

20 Claims, 6 Drawing Sheets

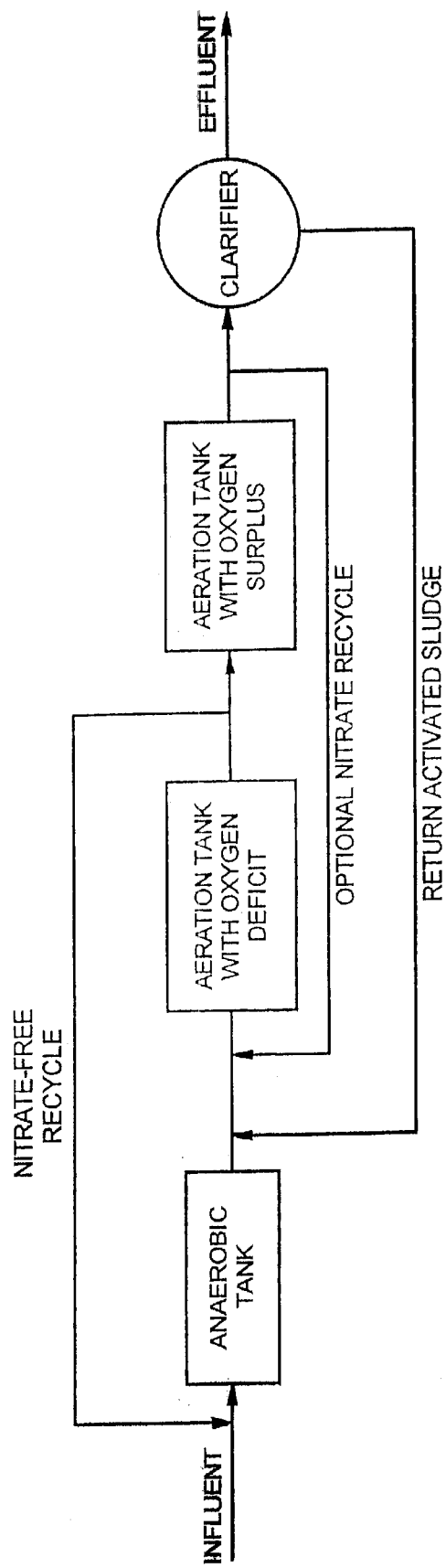

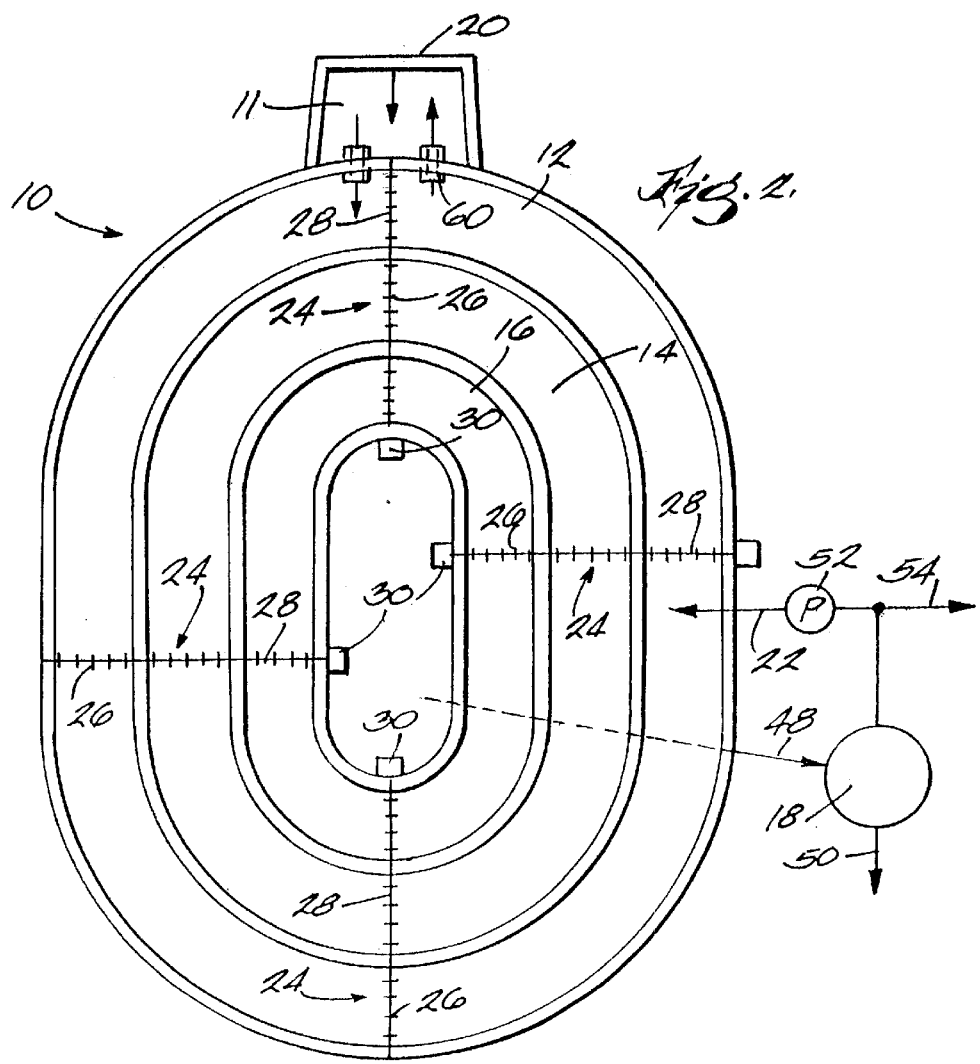
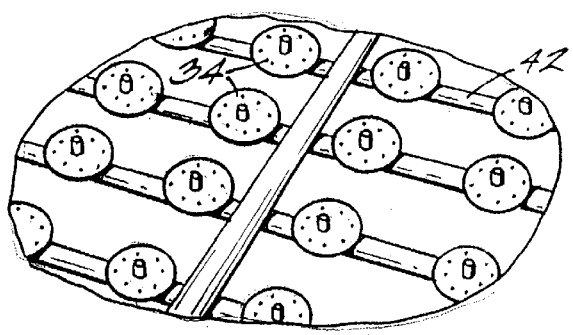
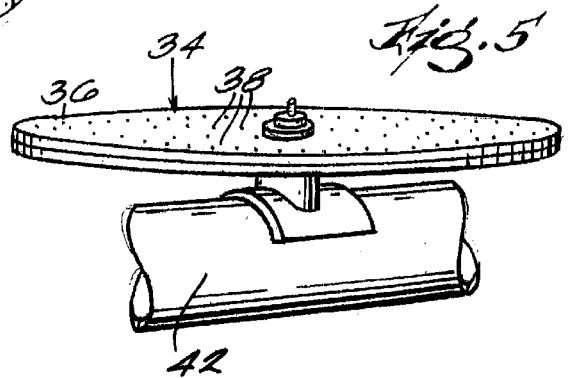

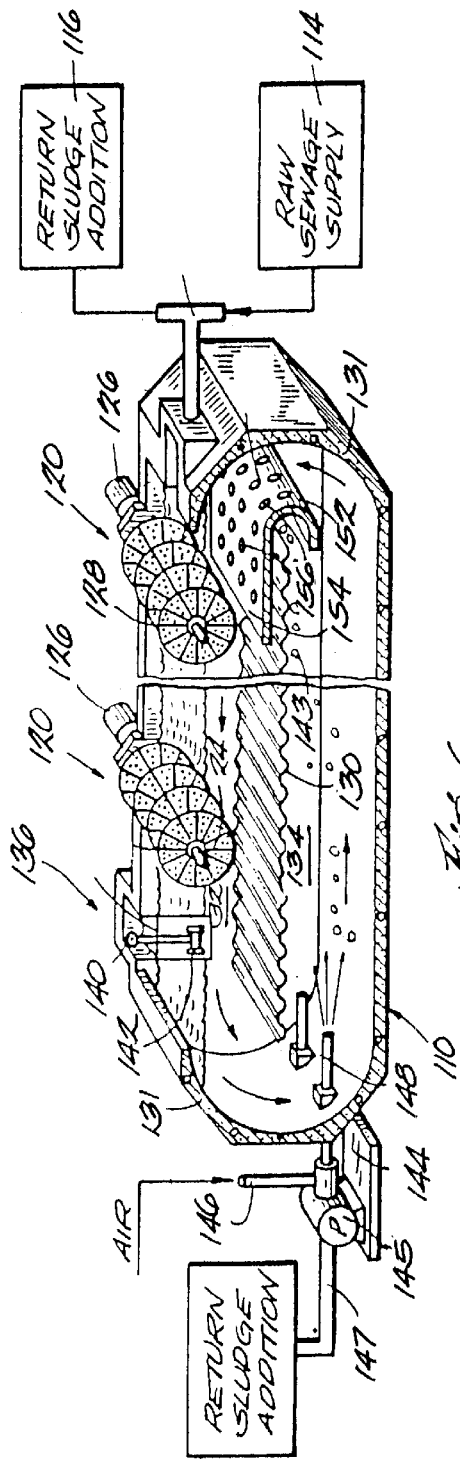
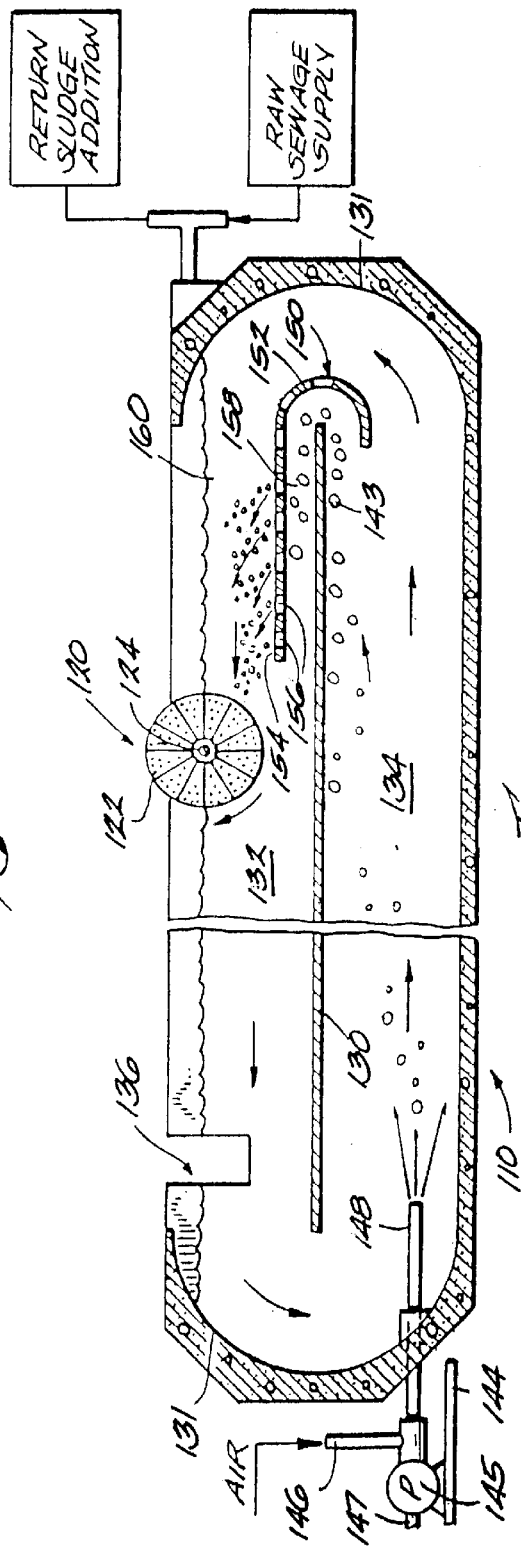

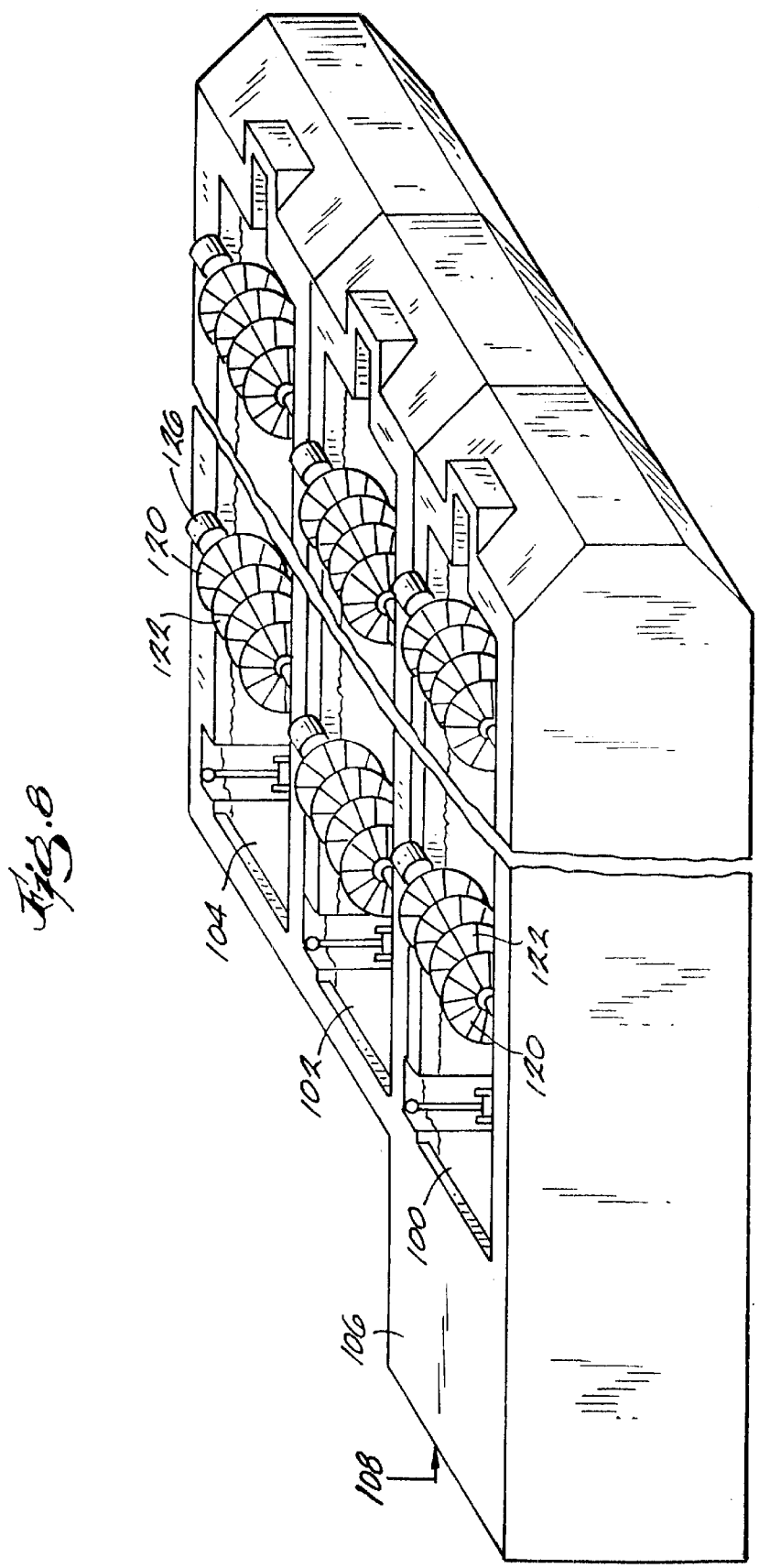

PROCESS FOR TREATING BOD-CONTAINING WASTEWATER

FIELD OF THE INVENTION

This invention relates to treatment of wastewaters containing BOD, phosphorus and nitrogen, such as municipal sewage, industrial wastewaters and the like by an activated sludge process. More particularly, the invention relates to a process whereby a wastewater influent is mixed with a denitrified-mixed liquor under anaerobic conditions before being mixed with recycled activated sludge in subsequent aeration zones.

BACKGROUND OF THE INVENTION

Activated sludge processes have been used to remove biological oxygen demand (BOD) from municipal sewage, industrial wastewaters and the like. In such a process, a wastewater influent is mixed with a microorganism-containing recycled biomass or activated sludge in an initial contact zone to form a mixed liquor. At some point in the process, the mixed liquor is aerated with sufficient oxygen to grow and maintain a satisfactory population of microorganisms which sorb, assimilate and metabolize the BOD of the wastewater.

In the activated sludge process disclosed in U.S. Pat. No. 3,964,998, wastewater and recycled activated sludge are mixed with mechanical stirrers in a first stage which is operated under anoxic conditions. The mixed liquor is subsequently aerated in a second stage, subjected to anoxic conditions in a third stage, aerated in a fourth stage and then clarified to separate an activated sludge.

In another process, wastewater and recycled activated sludge are mixed and circulated around a plurality of concentric, annular basins or channels by a plurality of surface aeration discs or other mechanical surface aeration devices which churn oxygen into the upper surface of the mixed liquor and provide sufficient agitation to prevent settling. The mixed liquor flows from one channel to the next and finally is introduced into a clarifier to separate an activated sludge. The channels can be operated as a series of complete mix reactors so that the dissolved oxygen content in the first channel in which the wastewater and recycled activated sludge is initially mixed is about zero or less and the dissolved oxygen content is subsequently increased as the mixed liquor moves from one channel to the next.

Other activated sludge wastewater treatment processes are disclosed in U.S. Pat. Nos. 3,764,523, 3,939,068, 3,953,327 and 3,994,802.

SUMMARY OF THE INVENTION

The invention provides a process for treating BOD, nitrogen and phosphorus containing wastewater. The process comprises introducing wastewater influent into an anaerobic zone having activated sludge and mixing the wastewater influent with the activated sludge in the anaerobic zone to form a mixed liquor. The mixed liquor is introduced into an oxygen-deficit aeration zone, and denitrified mixed liquor from the oxygen-deficit aeration zone is recycled to the anaerobic zone for mixing therein with wastewater. The process further comprises transferring the mixed liquor from the oxygen-deficit aeration zone to an oxygen-surplus aeration zone, transferring a portion of the mixed liquor from the oxygen-surplus aeration zone to a settling zone wherein a supernatant is separated from settled sludge and recycling at least a portion of the settled sludge to the oxygen-deficit aeration zone as recycled activated sludge.

In another aspect of the invention, a process for treating BOD-containing wastewater using a system employing a plurality of concentric, annular zones is provided. The process comprises introducing wastewater influent into an anaerobic zone having activated sludge and mixing the wastewater influent with the activated sludge in the anaerobic zone to form a mixed liquor. The mixed liquor is introduced into a first aeration zone maintained under conditions which produce a complete mix reaction and provide insufficient oxygen to meet, the biological oxygen demand of the resulting mixed liquor. Denitrified-mixed liquor from the first aeration zone is recycled to the anaerobic zone for mixing therein with wastewater. The process further comprises transferring the mixed liquor from the first aeration zone to a subsequent aeration zone maintained under conditions which produce a complete mix reaction and provide sufficient oxygen to produce an overall dissolved content of at least 0.5 mg/L, transferring the mixed liquor from the subsequent aeration zone to a settling zone wherein a supernatant is separated from settled sludge and recycling at least a portion of the settled sludge to the first aeration zone as recycled activated sludge.

In another aspect of the invention, another process for treating BOD, nitrogen and phosphorus containing wastewater is provided. The process comprises introducing wastewater influent into an anaerobic zone having activated sludge, mixing the wastewater influent with the activated sludge to form a mixed liquor and introducing the mixed liquor into an aerated anoxic zone promoting simultaneous nitrification and denitrification. Denitrified mixed liquor from the aerated anoxic zone is recycled to the anaerobic zone for mixing therein with wastewater. The mixed liquor is transferred to a subsequent aeration zone under conditions which produce a complete mix reaction and provide sufficient oxygen to product an overall dissolved oxygen content of at least 0.5 mg/L, and then transferred from the subsequent aeration zone to a settling zone wherein supernatant is separated from settled sludge. At least a portion of the settled sludge is recycled to the aerated anoxic zone.

BRIEF DESCRIPTION OF THE DRAWINGS

FIG. 1 is a schematic view of an improved wastewater treatment system embodying the invention.

FIG. 2 is a schematic and diagrammatic top plan view of an improved wastewater treatment system embodying the invention.

FIG. 4 is a fragmentary, top plan view of a bottom portion of the first channel shown in FIG. 3 and including fine bubble membrane diffusers.

FIG. 5 is an enlarged fragmentary view of a diffuser shown in FIG. 4.

FIG. 6 is a side perspective elevation view, in partial section, of a vertical loop reactor.

FIG. 7 is a side view of the reactor shown in FIG. 6.

FIG. 8 is a side perspective elevation view of a system including a series of vertical loop reactors downstream from an anaerobic zone.

Figure 3:
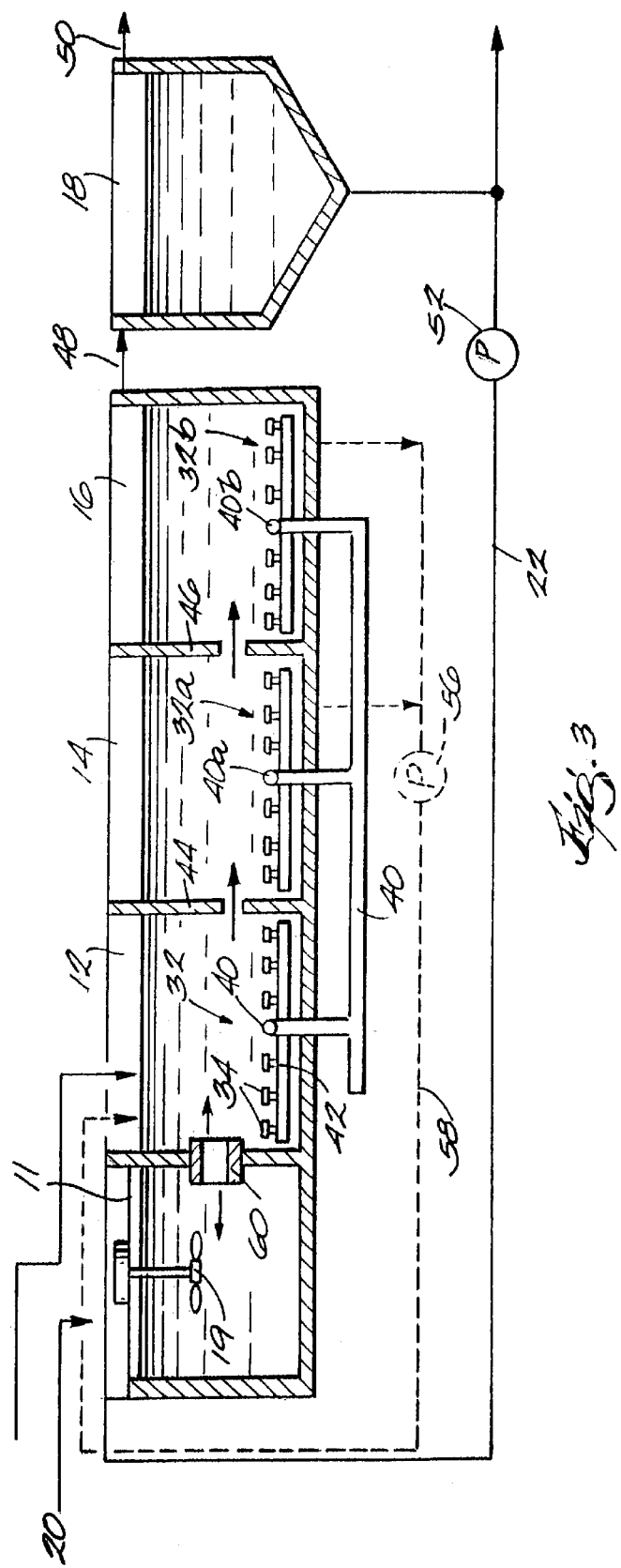
FIG. 3 is a schematic and diagrammatic side plan view of the system illustrated in FIG. 2.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 illustrates a schematic view of an improved wastewater treatment system embodying the invention. The invention employs a complete mix system for treating BOD, nitrogen and phosphorus containing wastewater. In the system, wastewater may or may not be pre-treated to remove grit, large particulate matter and other suspended solids. The wastewater is then fed through a conduit into an anaerobic reactor or reactors, which preferably utilize a mechanical mixer to keep solids in suspension without aeration.

As shown in FIG. 1, denitrified mixed liquor from a downstream aeration zone having a continuous oxygen deficit (defined below) is added to the anaerobic zone.

Typically, the denitrified mixed liquor is added at a rate from 0.5 to 2 times the wastewater influent flow rate. In the anaerobic reactor zone, micro-organisms capable of accumulating quantities of phosphorus in excess of that required for simple cell growth and reproduction take-up and store simple carbon compounds, using energy derived from the hydrolysis and release of polyphosphates. The hydraulic residence time in the anaerobic zone is typically, but not limited to, 0.5 to 2.0 hours.

The combined wastewater and denitrified mixed liquor then flow to one or more downstream aeration zones or tanks having a continuous oxygen deficit. As used herein, the terms "aeration zone or tank having a continuous oxygen deficit" and "oxygen-deficit aeration zone or tank" are synonymous and meant to refer to a zone having a continuous oxygen deficit maintained, e.g., by controlling the rate of aeration such that the rate of oxygen supply is less than the rate of oxygen consumption by the micro-organisms in the tank. This results in dissolved oxygen concentrations at or near zero throughout the basin. The terms "aeration zone having a continuous oxygen deficit" and "oxygen-deficit aeration zone" are also meant to refer to an aerated anoxic tank or zone, and more particularly to a zone or tank wherein simultaneous nitrification and denitrification take place. In other words, atmospheric oxygen is supplied to the tank, but does not meet the oxygen demand thereof. In contrast, in a non-aerated anoxic tank, simultaneous nitrification and denitrification do not take place as no atmospheric oxygen is supplied to the tank, i.e. no oxygen is supplied to the tank by aerators. Aerator devices (described below), or a combination of aerator devices and mechanical mixers provide oxygen and keep the mixed liquor solids in suspension. Settled sludge (i.e. return activated sludge) from a clarifier is added to the aeration zone having a continuous oxygen deficit. Nitrified mixed liquor from a downstream aeration zone having an oxygen surplus (defined below) can also be added thereto.

Using oxygen supplied by the aerators, heterotrophic organisms oxidize BOD and autotrophic organisms oxidize ammonia in the aeration tank having a continuous oxygen deficit. As the amount of oxygen supplied is less than the demand and nitrates from oxidation of ammonia are present, heterotrophic organisms will oxidize BOD using nitrates as an electron acceptor and converting nitrates into nitrogen gas. The hydraulic residence time in the aeration zone having a continuous oxygen deficit is typically, but not limited to, 2 to 12 hours.

The effluent from the aeration zone having a continuous oxygen deficit then flows to one or more downstream tanks having a continuous oxygen surplus. As used herein, the terms "aeration zone or tank having a continuous oxygen surplus" and "oxygen-surplus aeration zone or tank" are meant to refer to a aeration zone wherein the rate of oxygen supply meets or exceeds the demand of micro-organisms in the tank. Most of the BOD and ammonia in the wastewater has been oxidized by the time the wastewater reaches the last aeration zone, so dissolved oxygen concentrations of 1 mg/L or greater are easily maintained in the last aeration zone. Oxidation of BOD and ammonia occurs in the aeration tanks having a continuous oxygen surplus. In the aeration zone of continuous oxygen surplus, micro-organisms oxidize the carbon that they have absorbed in the anaerobic zone and absorb and store polyphosphates as an energy source for the return trip back to the anaerobic zone as return activated sludge. The hydraulic residence time in the aeration zone having a continuous oxygen surplus is typically, but not limited to, 2 to 12 hours.

Finally, effluent from the aeration tanks having a continuous oxygen surplus flows to the clarifier where the biological solids settle. A portion of the effluent may be returned to the biological process leaving a supernatant with reduced levels of organic matter, phosphorus and nitrogen. This supernatant is removed and becomes the process effluent. Some of the settled solids is removed from the system (waste activated sludge), thereby removing phosphorus and organic matter.

FIGS. 2 and 3 illustrate one embodiment of the improved wastewater treatment system 10 for practicing the activated sludge treatment process of the invention. The system 10 includes an initial anaerobic zone 11 and a plurality of concentric, annular basins or channels including a first aeration zone having an oxygen deficit 12, a second aeration zone having an oxygen surplus 14 and, alternatively, a third aeration zone having an oxygen surplus 16. The system 10 also includes a settling tank or clarifier 18. A wastewater influent, which usually is subjected to screening and/or preliminary sedimentation treatment (not shown) to remove large particulate materials, is introduced into the anaerobic zone 11 via a supply conduit 20 and mixed with denitrified-mixed liquor from a downstream aeration zone, e.g. the first aeration zone or channel 12.

The wastewater, denitrified-mixed liquor and activated sludge are mixed in the anaerobic zone 11 by a mechanical mixer 19, which allows solids in the wastewater to remain suspended without aeration. A non-aerated tank or reactor is used typically in the front part of the activated sludge process for biological phosphorus removal where the influent raw sewage flow is mixed and blended with aerobic biomass solids void of oxygen. The tank is designed typically to be void both of delivered oxygen (including DO contained in sidestreams) and the oxygen contained in nitrites and nitrates. Prior to entering these tanks, the aerobic biomass solids are usually routed through anoxic tanks to remove nitrites and nitrates and to remove any DO (dissolved oxygen) contained in the liquid stream. Blankets of nitrogen, carbon dioxide and other gases can also be used to limit the anaerobic zone's access to the atmosphere. These anaerobic reactors are merely illustrative, and should not be construed to limit the types of anaerobic zones which can be used in conjunction with the methods described herein. In other words, any anaerobic zone which is maintained under anaerobic conditions is suitable for use with the system.

Preferably, the denitrified-mixed liquor is added from a continuous-oxygen-deficit aeration zone (e.g. the first channel 12) to the anaerobic zone 11 as shown by arrow 60 in FIGS. 2 and 3. Denitrified-mixed liquor is a product of aerating and mixing wastewater influent with activated sludge under continuous-oxygen-deficit conditions. Preferably, the denitrified-mixed liquor is added at rate that is about 0.5 to 2 times the wastewater influent flow rate, although other rates can be used. Although the invention should in no way be limited by scientific theory, it is believed that in the anaerobic reactor zone, microorganisms capable of accumulating quantities of phosphorus in excess of that required for simple cell growth and reproduction, take up and store simple carbon compounds, using energy derived from the hydrolysis and release of polyphosphates. The hydraulic residence time in the anaerobic zone is preferably, but in no way limited to, 0.5 to 2 hours.

The combined wastewater and denitrified-mixed liquor then flow to one or more downstream aeration tanks having a continuous-oxygen deficit, e.g. first channel 12. The continuous-oxygen deficit is maintained by controlling the rate of aeration such that the rate of oxygen supply is less than the rate of oxygen consumption by the micro-organisms in the tank, thereby resulting in dissolved oxygen concentrations at or near zero throughout the zone. Aerator devices (discussed below), or a combination of aerator devices and mechanical mixers, provide oxygen and keep the mixed liquor solids in suspension. Settled sludge (i.e. return activated sludge) from the clarifier 18 can be added to the aeration zone having a continuous-oxygen deficit 12. In addition, nitrified-mixed liquor from a downstream aeration zone having an oxygen surplus, e.g., third channel 16, may be recycled by a pump 56 through a conduit 58 to the continuous-oxygen-deficit aeration zone 12 as illustrated by dashed lines in FIG. 3.

The contents of the first channel 12 (collectively "the mixed liquor") are mixed therein in part by a plurality of surface aeration devices 24. Each surface aeration device 24 includes a plurality of aeration discs 26 mounted on a shaft 28 which is rotated by an electric motor 30 or other suitable driver. Each aeration disc 26 has a plurality of apertures or recesses (not shown) for catching or entraining air which is dispersed into the mixed liquor as fine bubbles during disc rotation. The rotating aeration discs 26 effectively mix and aerate the upper portion of the mixed liquor and keep the mixed liquor moving around the first channel 12.

Although the invention should in no way be limited by scientific theory, it is believed that by using oxygen supplied by the aerators 24, heterotrophic organisms can oxidize BOD and autotrophic organisms can oxidize ammonia in the aeration tank having a continuous-oxygen deficit. Because the amount of oxygen supplied is less than the demand and because nitrates from oxidation of ammonia are present, heterotrophic organisms will also oxidize BOD using nitrates as an electron acceptor and convert nitrates into nitrogen gas. The hydraulic residence time in the aeration zone with a continuous-oxygen deficit is preferably, but should not be limited to, 2 to 12 hours.

In an alternative embodiment, the mixed liquor in the first channel 12 may be mixed in part by a plurality of submerged aeration devices 32 which are located in the lower portion of the first channel 12 and produce fine bubbles having a diameter of less than about 4 mm, and preferably about 1 to about 3 mm. Submerged aeration devices are not required by the invention. The oxygen-containing gas is introduced by the surface and submerged aeration devices 24 and 32 under conditions which produce a complete mix reaction in the first channel 12 and sufficient oxygen is supplied to meet, but not substantially exceed, the biological oxygen demand of the mixed liquor. As discussed above, the dissolved oxygen content preferably is maintained at as close to zero as possible. However, because of changing conditions it may periodically fluctuate above and below zero. The overall dissolved oxygen content in the first channel 12 should not exceed about 0.5 mg/l.

The oxygen-containing gas preferably is air and the submerged aeration devices preferably are conventional coarse or fine bubble (fine pore) membrane diffusers 34 having an expandable flexible member 36 including a plurality of perforations 38 through which air is injected into the contents of the first channel 12. The diffusers 34 are uniformly distributed in the lower portion of the first channel 12, either near the bottom or along one side. The diffusers 34 can be either a pipe type or a disc.

The relatively large surface area to volume ratio of fine bubbles having a diameter of 4 mm or less results in a more efficient transfer of oxygen into the mixed liquor than is possible with other aeration devices. Fine bubble membrane diffusers are particularly advantageous because the membrane can be periodically flexed to dislodge material produced in the low dissolved oxygen environment of the first channel 12 which might plug the perforations 38, a shortcoming of fine bubble ceramic diffusers and plate aerators. Fine bubble membrane diffusers can be intermittently operated, if desired, to control the amount of oxygen-containing gas introduced and thereby permit the dissolved oxygen content to be maintained within an optimum range.

As the fine air bubbles rise from the diffusers 34, they produce a turbulent mixing action in the lower portion of the first channel 12 which, in combination with the mixing movement provided by the rotating aeration discs 26, prevents solids in the mixed liquor from settling. Air flow to the diffusers 34 can be controlled to produce, in combination with the air introduced by the rotating aeration discs 26, the dissolved oxygen content discussed above. Thus, the diffusers 34 serve the dual function of providing part of the oxygen required to meet the biological oxygen demand of the mixed liquor and mixing of the mixed liquor in the lower portion of the first channel 12.

The diffusers 34 can be operated to provide a substantial part of the mixing required to prevent settling and a substantial part of the oxygen required to meet the biological oxygen demands of the mixed liquor. In that case, the primary function of the rotating aeration discs 26 is to keep the mixed liquor moving around the first channel 12 and the secondary function is to introduce a relatively small amount of air into the mixed liquor. This can result in the reduction of the number of discs and the amount of energy required to operate them. If the diffusers 34 are used more as a supplemental supply of oxygen and to provide supplemental mixing in the lower portion of the first channel 12, the combined mixing and oxygen provided by the rotating aeration discs 26 and the diffusers 34 permits the first channel to be much deeper than in conventional wastewater treatment processes employing only surface aeration devices. This can result in a reduction in initial system installation costs.

In the specific embodiment illustrated, a plurality of disc-type fine bubble membrane diffusers 34 are mounted in a grid-like array in the bottom of the first channel 12. Air is supplied under pressure through a manifold 40 (which may or may not be in fluid communication with other manifolds, e.g., 40a, 40b) connected to a plurality of air supply conduits 42 which are arranged in parallel rows. A plurality of longitudinally spaced diffusers 34 are mounted on each supply conduit 42, preferably in an array so that the diffusers on adjacent air supply conduits form rows transverse to the air supply conduits.

Effluent from the aeration zone having a continuous-oxygen deficit 12 flows to one or more tanks having a continuous-oxygen surplus. More particularly, a portion of the mixed liquor (approximately equal to the combined flow of the wastewater influent and the recycled activated sludge) flows from the first channel 12 into the second channel 14 through a submerged transfer port 44. In another embodiment of the invention, the wastewater influent and recycled activated sludge continue to flow from the second channel 14 into the third channel 16 through a submerged transfer port 46. The mixed liquor is moved around the second and third channels 14 and 16 by the rotating aeration discs 26 while an oxygen-containing gas may be introduced into the lower portion of each channel by submerged aeration devices 24 or 32a and 32b, respectively. The combined effect of the surface and submerged aeration devices produce a complete mix reaction in both the second and third channels 14 and 16. The overall dissolved oxygen content in the second channel 14 is preferably at least 0.5 mg/l and preferably greater than about 1.0 mg/l. The overall dissolved oxygen content of the third channel 16 is preferably at least 2.0 mg/l.

By the time the wastewater reaches the last aeration zone, most of the BOD and ammonia in the wastewater has been oxidized, thereby making dissolved oxygen-concentrations of 1 mg/l or greater easy to maintain in the last aeration zone. Oxidation of BOD and ammonia occurs in the aeration tanks having a continuous-oxygen surplus. It is believed that in the aeration zones having continuous-oxygen surplus, micro-organisms oxidize the carbon absorbed in the anaerobic zone and also absorb and store polyphosphates as an energy source for their return to the anaerobic zone as return activated sludge. The hydraulic residence time in the aeration zone with a continuous-oxygen surplus is typically, but in no way limited to, about 2 to 12 hours.

Various arrangements can be employed to introduce oxygen-containing gas into the lower portions of the second and third channels 14 and 16. For example, conventional fine bubble membrane diffusers 34a and 34b like those used in the first channel 12 and arranged in a similar manner can serve the dual functions of supplementing the oxygen supply and agitation as discussed above.

The mixed liquor is transferred from one of the continuous-oxygen surplus aeration zones, e.g. the second channel 14 or the third channel 16, into clarifier 18 through a conduit 48. Sludge settles in the clarifier 18 leaving a clarified effluent or supernatant having reduced levels of organic matter, phosphorus or nitrogen. A portion of the supernatant may be withdrawn from the upper portion of the clarifier via a conduit 50 for further treatment prior to disposal or reuse. This supernatant is removed and becomes the process effluent. A portion of the settled sludge withdrawn from the bottom portion of the clarifier 18 is recycled by a pump 52 through the conduit 22 back to the first channel 12 as illustrated by solid lines in FIGS. 2 and 3. Another portion of settled sludge is removed via a conduit 54. The amount of activated sludge recycled to the first channel 12 usually is about 15 to about 150, preferably about 50 to about 100%, of the wastewater influent introduced through the conduit 20.

With such a process, up to about 80% of the nitrogen values can be removed from a wide variety of wastewaters. When removal of a higher amount of nitrogen is desired, a portion of nitrified mixed liquor from the third channel 16 and/or the second channel 14 is recycled by a pump 56 through a conduit 58 as illustrated by dashed lines in FIG. 3. The amount of mixed liquor recycled to the first channel usually is about 100 to about 400% of the wastewater influent being introduced through the conduit 20.

Full-scale tests with aeration tanks with a continuous-oxygen deficit, followed by aeration tanks with an oxygen surplus, (such as in the ORBAL™ process) have shown that high rates of both nitrification and denitrification will occur in the aeration tanks with a continuous-oxygen deficit, thereby reducing or eliminating the need to pump nitrates from the tank with the oxygen surplus to the tank with the oxygen deficit. Reducing or eliminating the need to pump nitrates from the tank with the oxygen surplus to the tank with the oxygen deficit has resulted in electrical power savings and has produced lower effluent total nitrogen concentrations.

Initially introducing wastewater into an anaerobic zone before subjecting the wastewater to the subsequent aeration zones as discussed above is believed to enhance biological phosphorus removal. More particularly, it is believed that the anaerobic zone causes the micro-organisms to release phosphorus, thereby allowing the micro-organisms to take up phosphorus at a much higher rate in the different aeration zones. In fact, utilizing an anaerobic zone has been attributed to reducing the phosphorus concentration in treated waters from about 5 mg/l to about 2.5 mg/l.

In another embodiment of the invention, a vertical loop reactor (VLR®) system modified to include an initial anaerobic zone can be employed. Suitable anaerobic zones or tanks for use in the modified VLR® system are set forth above, and can be fluidly connected to the VLR®. A suitable vertical loop reactor system is described below and in U.S. Pat. No. 4,629,559 issued to Smith which is hereby fully incorporated by reference. FIGS. 6–7 show in detail an individual vertical loop reactor.

The VLR® can be installed in a rectangular tank, and is similar to an oxidation ditch that has been flipped on its side. There are upper and lower compartments 132 and 134, separated by a horizontal baffle 130 running the length of the tank. Commonly, three basins make up a VLR® system. The VLR® process is adapted from proven ORBAL™ technology and uses the same surface mounted discs or aerators 120 (described above) to provide mixing and to deliver oxygen.

The typical VLR system has two or more rectangular tanks 100, 102, 104 placed side by side and operated in series. Like the improved ORBAL™ process, an anaerobic zone 106 is followed by a downstream first tank 100. The first tank 100 is used as an aerated anoxic reactor, i.e. an aeration zone having a continuous oxygen deficit, in which an oxygen deficit is maintained and the DO level is kept near zero. The subsequent VLR tanks 102, 104 are maintained under aerated conditions having a continuous oxygen surplus. In other words, the initial anaerobic zone 106 is followed by a downstream VLR® tank 100 having an oxygen deficit and one or more VLR® tanks having an oxygen surplus 102 and 104. For example, the last tank 104 may be operated with a DO level of 2 mg/L or higher.

Most VLR®'s are designed for liquid depths greater than 20 feet. The horizontal baffle 130 is located about mid-depth so that both upper and lower compartments 132 and 134 are about 10 feet deep. The surface aeration discs 120 establish and "over and under" mixing pattern, with the flow direction on the surface opposite the flow direction on the bottom.

FIG. 6 depicts a relatively deep wastewater VLR® tank composed of a suitable material such as concrete, synthetic resin, steel, etc. The tank is generally of rectangular shape and can vary in size. For example, the longer axis of the tank can vary in length up to about 100–200 feet, while the width may vary from about 50–100 feet. Preferably, the tank has a liquid depth of about 10–25 feet.

Raw sewage enters tank 100 through influent conduit 108 into an anaerobic tank or zone 106. Any of the anaerobic tanks or zones described above can be employed in the improved VLR® system. The wastewater influent is mixed with activated sludge present in the anaerobic tank 106 to form a mixed liquor.

The mixed liquor is then introduced into a VLR® 100 which acts as an oxygen-deficit aeration zone, i.e. an aeration zone maintained under aerated anoxic conditions as defined above. The mixed liquor is then aerated using mechanical aerators 120 so that air bubbles or the like are introduced into the sewage in the upper layer of the tank. Aerators 120 comprises a plurality of disks 122 mounted on a common axle 124 oriented on a transverse axis to the flow of sewage and designed to rotate at least partially in contact with the mixed liquor entering tank 100 via influent conduit 112. A portion of this denitrified-mixed liquor from the oxygen-deficit zone 100 may be recycled to the anaerobic zone 106 for mixing therein with wastewater.

The axle 124 is operationally connected to a rotator 126 such as an electric motor. The disks 122 are provided with a plurality of fine perforations and depressions 128 which function not only to carry air bubbles into and below the surface of the sewage liquor but also to trap subsurface liquid therein and carry drops thereof upwardly into contact with the ambient air. As shown, a plurality of mechanical aerators 120 and the speed of rotation may be varied to suit the operational conditions of the tank 100 and the incoming sewage. The mechanical aerators 120 thus introduces air below the surface of the liquid in tank 100 and provides surface energy through flow agitation of the sewage to prevent settling out of sewage solids.

Figure 9:
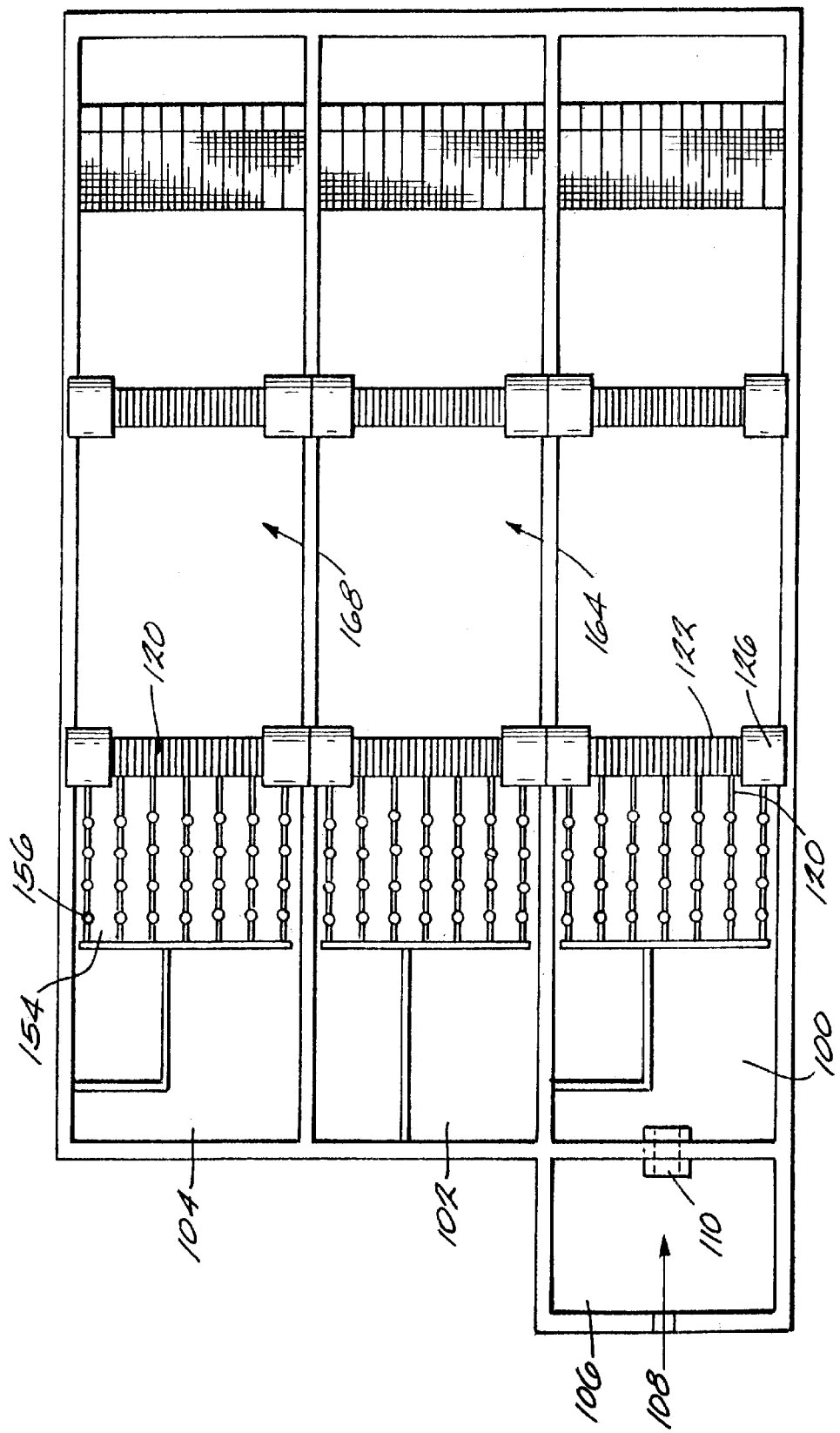
FIG. 9 is a top plan view of the system shown in FIG. 8.

A baffle-like member 130 is mounted within the tank below the normal liquid level approximately horizontally dividing the interior of tank 100 into a plurality of equal volume flow passageways in the preferred embodiment comprising an upper flow passageway 132 and a lower flow passageway 134. As will be shown below in FIG. 9, more than two flow passageways may be provided without deviating from the spirit of the invention. The baffle-like member 130 is gas-impermeable and may be composed of any rigid material such as metal or synthetic resin, but corrosion resistant characteristics are preferred. The baffle member may be formed in corrugated fashion, as shown, or in other fashion to increase its strength. The corrugation performs the additional function of preventing air bubbles from forming a film or otherwise congregating underneath the baffle-like member 130.

Mixed liquor flowing into tank 100 through influent conduit 110 is immediately mixed with the contents of tank 100 and with air by mechanical aerators 120. The aerator 120 functions generally in a plane parallel to the direction of flow and introduces air and flow energy into the sewage.

More specifically, mechanical aerators 120 perform the dual function of mixing air into the mixed liquor by drawing oxygen depleted sewage into the air and by pulling air into the wastewater. Mechanical aerators 120 also create a tank flow pattern in flow passageways 132 and 134 of an adequate velocity necessary to maintain the waste solids in a suspended condition. The waste solids must remain suspended as long as possible to enable the microscopic biota to optimally encounter and digest the organic waste compounds.

This directional flow created by mechanical aerator 120 is aided by the geometry of the inner tank surface with its curved end walls 131, and travels along the entire length of the upper flow passageways 132 into the lower flow passageway 134 and then back into the upper flow passageway 132.

The flow of wastewater carries air in the form of trapped bubbles along this cyclical path from the upper 132 to the lower flow passageway 134, where the oxygen component of the air is dissolved within the sewage liquors and is depleted by the active organisms contained in the water. The nature of the flow cycle is such that as a particular portion of liquid wastewater travels through the upper and lower passageways 132 and 134, it will be gradually depleted of its supply of oxygen from the point at which it leaves the mechanical aerator 120, until it encounters another aerator or returns to the starting point. The oxygen depleted nature of the wastewater as it encounters the aerator 120 significantly increases the efficiency of the device by facilitating the absorption of oxygen. It may be necessary to delay the escape of air bubbles from the tank 100 after they reach the end of baffle-like member 130, so that the oxygen may be more readily absorbed by the microorganisms. It is also desirable to increase the air to water surface area of the relatively large, accumulated bubbles by fragmenting them into a plurality of smaller bubbles.

Under utilization of oxygen is addressed in the present invention by providing an alternative secondary gas permeable baffle 150, attached to the sides of tank 100. Secondary baffle 150 is comprised of a curved gas capture portion 152 and a substantially horizontal gas release portion 154 having a plurality of randomly spaced gas release apertures 156. The secondary baffle 150 is positioned in the tank 100 above baffle-like member 130 to create a narrow chamber 158, said chamber having a height on the order of 1–2 feet. Secondary baffle 150 is further positioned in tank 100 near the end of baffle-like member 130 so that the curved gas capture portion 152 can intercept the large bubbles 143 as they escape from underneath baffle-like member 130.

The large bubbles 143 then flow into narrow chamber 158, where their natural tendency to rise to the surface forces them through the smaller gas release apertures 156. The gas release apertures 156 are constructed and arranged to create small bubbles 160 of the approximate size of bubbles emitted from a coarse bubble diffuser device which is standard in the industry, or on the order of one-quarter to 0.178 inch in diameter. This creation of a plurality of small bubbles 160 from the large bubbles 143 in chamber 158 significantly increases the oxygen transfer efficiency of the system by providing additional air/liquid surface area.

In the preferred embodiment, gas release portion 154 is oriented substantially parallel with baffle-like member 130 and extends longitudinally away from the gas capture portion approximately 15–30% of the length of baffle-like member 130. The exact position of secondary baffle 150 may vary as long as its air capture function is not impaired and the flow of sewage liquor in flow passageway 132 is not impeded. Small bubbles 160 are released into the upper flow passageway 132 on an angular trajectory as they are carried into the moving flow of wastewater.

The circulation is maintained for a period of time sufficient for at least a substantial portion of the raw sewage to be processed. Subsequently, mixed liquor is introduced into one or more subsequent aeration tanks or VLR®'s 102 or 104 having continuous oxygen surplus as defined above. The actual structure of the subsequent tanks is similar to the VLR® described above, except that it is maintained under conditions which provide an oxygen surplus. Effluent flows from tank 100 to 102 by conduit 164, and from tank 102 to tank 104 by conduit 168. Preferably, the second VLR® 102 has a dissolved oxygen concentration of 1 mg/L or greater and the third VLR® 104 has an overall dissolved oxygen concentration of 2 mg/L or greater. The effluent proceeds from the outlet 172 to a final clarifier (not shown) wherein sludge is removed for ultimate disposal and/or recycling by mixing with fresh raw sewage. The remaining effluent is clarified and otherwise treated to yield useful water which can be discharged into streams or the like. A portion of the settled sludge is recycled to the aerated VLR® having oxygen deficit as recycled activated sludge.

I claim:

1. A process for treating BOD, nitrogen and phosphorus containing wastewater, the process comprising:
    introducing wastewater influent into an anaerobic zone having activated sludge;
    mixing the wastewater influent with the activated sludge in the anaerobic zone to form a mixed liquor;
    introducing the mixed liquor into an oxygen-deficit aeration zone;
    recycling denitrified mixed liquor from the oxygen-deficit aeration zone to the anaerobic zone for mixing therein with wastewater;
    transferring the mixed liquor from the oxygen-deficit aeration zone to an oxygen-surplus aeration zone;
    transferring a portion of the mixed liquor from the oxygen-surplus aeration zone to a settling zone wherein a supernatant is separated from settled sludge; and
    recycling at least a portion of the settled sludge to the oxygen-deficit aeration zone as recycled activated sludge.

2. The process according to claim 1, wherein oxygen deficit in the oxygen-deficit aeration zone is maintained by controlling aeration so that oxygen supply is less than oxygen consumption by microorganisms therein.

3. The process according to claim 2, wherein the continuous oxygen-deficit aeration zone has a dissolved oxygen concentration of about zero.

4. The process according to claim 1, wherein an aerator device in the oxygen-deficit aeration zone provides oxygen-containing gas and a mixer keeps the mixed liquor in suspension.

5. The process according to claim 4, wherein the aerator device includes a fine bubble membrane diffuser including a flexible membrane having perforations through which the oxygen-containing gas is injected.

6. The process according to claim 4, wherein the aerator device includes aeration discs.

7. The process according to claim 1, wherein the oxygen-surplus aeration zone has a dissolved oxygen concentration of at least about 0.5 mg/l.

8. The process according to claim 1, wherein in the oxygen-deficit aeration zone promotes simultaneous nitrification and denitrification.

9. The process according to claim 8, wherein oxygen deficit in the oxygen-deficit aeration zone is produced by supplying atmospheric oxygen at a rate that does not meet oxygen demand therein.

10. The process according to claim 1, wherein the supernatant has a phosphorus concentration of less than 2.5 mg/l.

11. The process according to claim 1, further comprising recycling a portion of mixed liquor from the oxygen-surplus aeration zone to the oxygen-deficit aeration zone for mixing therein with the wastewater and the recycled activated sludge.

12. A process for treating BOD-containing wastewater using a system employing a plurality of concentric, annular zones, the process comprising:
    introducing wastewater influent into an anaerobic zone having activated sludge;
    mixing the wastewater influent with the activated sludge in the anaerobic zone to form a mixed liquor;
    introducing the mixed liquor into a first aeration zone maintained under conditions which produce a complete mix reaction and provide insufficient oxygen to meet the biological oxygen demand of the resulting mixed liquor;
    recycling denitrified-mixed liquor from the first aeration zone to the anaerobic zone for mixing therein with wastewater;
    transferring the mixed liquor from the first aeration zone to a subsequent aeration zone maintained under conditions which produce a complete mix reaction and provide sufficient oxygen to produce an overall dissolved content of at least 0.5 mg/L;
    transferring the mixed liquor from the subsequent aeration zone to a settling zone wherein a supernatant is separated from settled sludge; and
    recycling at least a portion of the settled sludge to the first aeration zone as recycled activated sludge.

13. The process according to claim 12, wherein the overall dissolved oxygen content in the first aeration zone does not exceed about 0.5 mg/l.

14. The process according to claim 12 further comprising recycling a portion of the mixed liquor from the subsequent aeration zone to the first aeration zone for mixing therein with the wastewater and the recycled activated sludge.

15. The process according to claim 12, wherein the subsequent aeration zone comprises:
    a second aeration zone maintained under conditions which produce a complete mix reaction and provide sufficient oxygen to produce an overall dissolved oxygen content within the range of about 0.5 to about 1.5 mg/l; and
    a third aeration zone, maintained under conditions which produce a complete mix reaction and provide sufficient oxygen to produce an overall dissolved oxygen content of at least 2.0 mg/l in the third aeration zone.

16. The process according to claim 15, further comprising recycling a portion of the mixed liquor from the second aeration zone, the third aeration zone or both the second and third aeration zones to the first aeration zone for mixing therein with the wastewater and the recycled activated sludge.

17. The process to claim 12, wherein the first aeration zone promotes simultaneous nitrification and denitrification.

18. A process for treating BOD, nitrogen and phosphorus containing wastewater, the process comprising:
    introducing wastewater influent into an anaerobic zone having activated sludge;
    mixing the wastewater influent with the activated sludge to form a mixed liquor;
    introducing the mixed liquor into an aerated anoxic zone promoting simultaneous nitrification and denitrification;

recycling denitrified mixed liquor from the aerated anoxic zone to the anaerobic zone for mixing therein with wastewater;

transferring the mixed liquor to a subsequent aeration zone under conditions which produce a complete mix reaction and provide sufficient oxygen to product an overall dissolved oxygen content of at least 0.5 mg/L;

transferring the mixed liquor from the subsequent aeration zone to a settling zone wherein supernatant is separated from settled sludge; and recycling at least a portion of the settled sludge to the aerated anoxic zone.

19. The process of claim 18 further comprising recycling a portion of the mixed liquor from the subsequent aeration zone to the aerated anoxic zone for mixing therein the wastewater and the recycled activated sludge.

20. The process of claim 18, wherein the aerated anoxic zone provides an oxygen deficit by supplying atmospheric oxygen at a rate that does not meet oxygen demand therein.

* * * * *